United States Patent
Hong et al.

(10) Patent No.: US 7,580,213 B2
(45) Date of Patent: Aug. 25, 2009

(54) APPARATUS AND METHOD TO MINIMIZE AMPLITUDE VARIATIONS ASSOCIATED WITH MEDIA/HEAD RESPONSE CHARACTERISTICS IN SERVO WRITING OF PERPENDICULAR MAGNETIC RECORDING

(75) Inventors: Sooyoul Hong, Santa Clara, CA (US); Joe Bragg, San Jose, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 411 days.

(21) Appl. No.: 11/726,431

(22) Filed: Mar. 21, 2007

(65) Prior Publication Data
US 2008/0231984 A1    Sep. 25, 2008

(51) Int. Cl.
*G11B 5/09* (2006.01)

(52) U.S. Cl. .......................................... 360/51; 360/75

(58) Field of Classification Search ...................... None
See application file for complete search history.

(56) References Cited

U.S. PATENT DOCUMENTS

| | | | | |
|---|---|---|---|---|
| 4,535,372 | A | * | 8/1985 | Yeakley .................... 360/77.05 |
| 4,698,523 | A | * | 10/1987 | Gershon et al. ................ 327/61 |
| 5,333,140 | A | * | 7/1994 | Moraru et al. ............... 714/719 |
| 5,422,760 | A | * | 6/1995 | Abbott et al. .................. 360/46 |
| 5,541,784 | A | * | 7/1996 | Cribbs et al. ................... 360/75 |
| 6,118,614 | A | * | 9/2000 | Lee ............................... 360/75 |
| 2002/0196571 | A1 | * | 12/2002 | Hilla et al. ..................... 360/51 |

* cited by examiner

*Primary Examiner*—Jason C Olson
(74) *Attorney, Agent, or Firm*—Ben J. Yorks; Irell & Manella LLP

(57) ABSTRACT

A servo writer that writes servo information onto a disk of a hard disk drive. The writing of the servo can be synchronized by a clock track that contains a clock read back signal. The clock read back signal is differentiated by a differentiator circuit. A clamping circuit clamps the clock read back signal to minimize signal ringing, undershoot and overshoot phenomena in the signal.

20 Claims, 6 Drawing Sheets

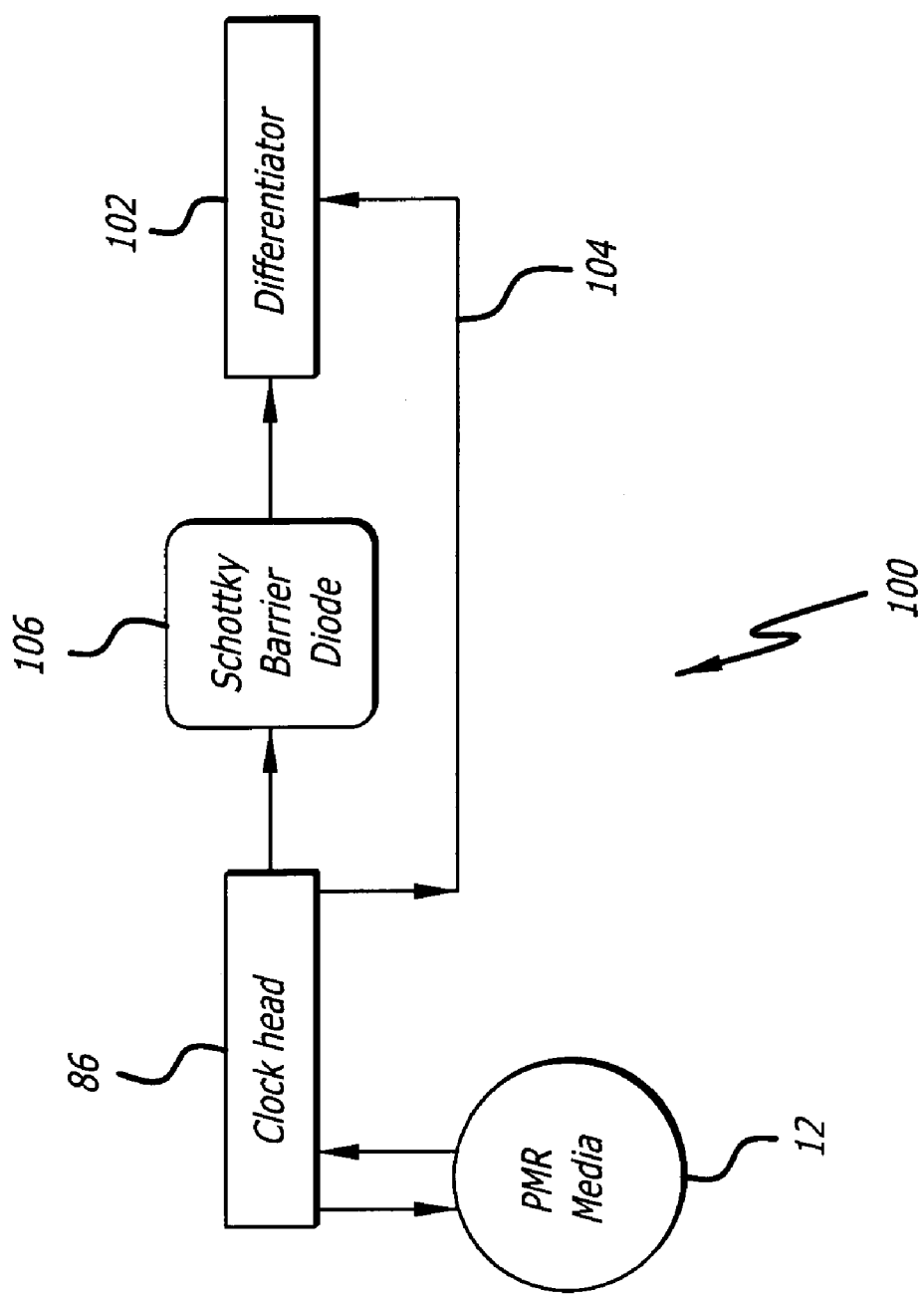

APPARATUS AND METHOD TO MINIMIZE AMPLITUDE VARIATIONS ASSOCIATED WITH MEDIA/HEAD RESPONSE CHARACTERISTICS IN SERVO WRITING OF PERPENDICULAR MAGNETIC RECORDING

BACKGROUND OF THE INVENTION

1. Field of the Invention

The present invention relates to a circuit used to write servo onto disks of a hard disk drive.

2. Background Information

Hard disk drives contain a plurality of magnetic heads that are coupled to rotating disks. The heads write and read information by magnetizing and sensing the magnetic fields of the disk surfaces. Generally, there are two ways to record data, horizontal recording and perpendicular recording. With horizontal recording the disk is magnetized parallel with the disk surface. In vertical recording the disk is magnetize in a direction perpendicular to the disk surface.

Each head is attached to a flexure arm to create a subassembly commonly referred to as a head gimbal assembly ("HGA"). The HGA's are suspended from an actuator arm. The actuator arm has a voice coil motor that can move the heads across the surfaces of the disks.

Information is typically stored on radial tracks that extend across the surface of each disk. Each track is typically divided into a number of segments or sectors. The voice coil motor and actuator arm can move the heads to different tracks of the disks.

FIG. 1 shows a typical track that has a number of fields associated with each sector. A sector may include an automatic gain control ("AGC") field 1 that is used to adjust the strength of the read signal, a sync field 2 to establish a timing reference for the circuits of the drive, and ID 3 and Gray Code 4 fields to provide sector and track identification, respectively.

Each sector may have also a servo field 5 located adjacent to a data field 6. The servo field 5 contains a plurality of servo bits A, B, C and D that are read and used to position the head 7 relative to the track.

The fields 1-5 are written onto the disk surfaces during the manufacturing process of the disk drive. These fields are typically written with a servo writer. The servo tracks are sometimes written using a number of spiral servo tracks initially written onto the disks. FIG. 2 shows an example of a number of spiral servo tracks written onto a disk. Using spiral servo tracks is sometimes referred to as an Ammonite servo write process. The spiral servo tracks are used to write the final radial servo tracks that are utilized during the normal operation of the disk drive.

As shown in FIG. 2, the radial start point of each spiral track may vary. This variation in start points may be caused by system vibration, servo track writer positioning errors and other factors. The variation of the start points will vary the location of the spiral tracks and ultimately create inaccuracies in the final servo pattern. Inaccurate servo can lower the density and degrade the performance of the drive. It would be desirable to improve the accuracy of spiral servo tracks used to write radial servo patterns.

One approach to achieving a common spiral track start point has been to include a clock track that contains a circumferential index, and a band of conventional servo tracks that include a radial index. The clock track is read by a clock head of a servo writer. The reference tracks are read by the heads of the drive. A spiral servo track is written when the circumferential index and the radial index are both detected.

The clock track contains a clock signal. For horizontal recording the clock signal has the form of a sine wave. At low frequencies, perpendicularly recorded clock tracks provide a square clock signal. The square clock signal is differentiated by a differentiator circuit to detect missing or extra pulses. It has been found that signal ringing, undershoot and overshoot may occur when reading a square clock signal. The ringing, undershoot and overshoot may create false signals and inaccurate timing data. It would be desirable to eliminate the signal ringing, undershoot and overshoot that occurs when reading a perpendicularly recorded clock signal.

BRIEF SUMMARY OF THE INVENTION

A servo writer that writes servo onto a disk of a hard disk drive. The servo writer includes a clock head that reads a clock track of the disk. A differentiator circuit is coupled to the clock head. A clamping circuit is coupled to the clock head and the differentiator circuit.,

BRIEF DESCRIPTION OF THE DRAWINGS

FIG. 8 is a schematic of a clamping circuit of the e servo writer;

DETAILED DESCRIPTION

Disclosed is a servo writer that writes servo information onto a disk of a hard disk drive. The writing of the servo can be synchronized by a clock track that contains a clock read back signal. The clock read back signal is differentiated by a differentiator circuit. A clamping circuit clamps the clock read back signal to minimize signal ringing, undershoot and overshoot phenomena in the signal.

Figure 3:
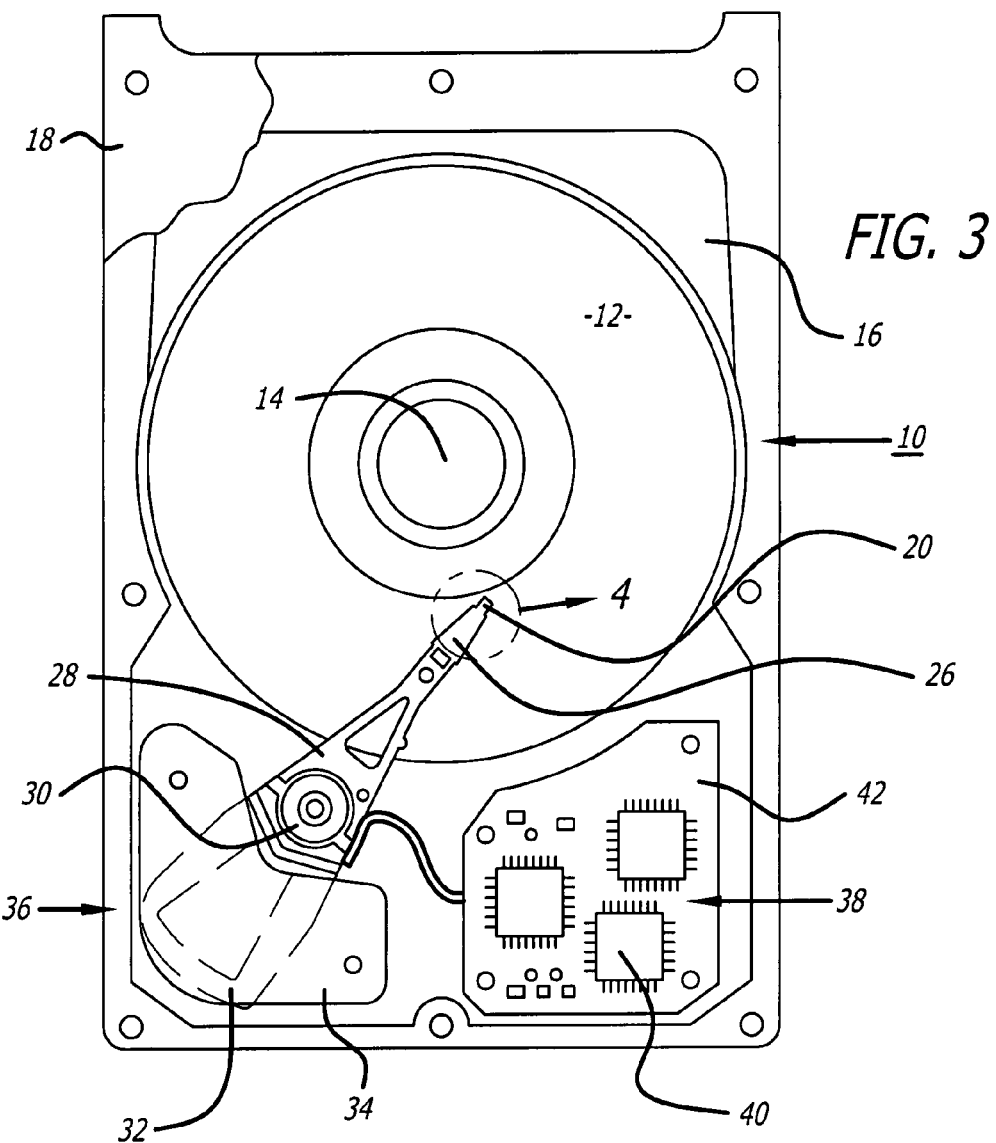
FIG. 3 is a top view of an embodiment of a hard disk drive.

Referring to the drawings more particularly by reference numbers, FIG. 3 shows an embodiment of a hard disk drive 10 of the present invention. The disk drive 10 may include one or more magnetic disks 12 that are rotated by a spindle motor 14. The spindle motor 14 may be mounted to a base plate 16. The disk drive 10 may further have a cover 18 that encloses the disks 12.

Figure 4:
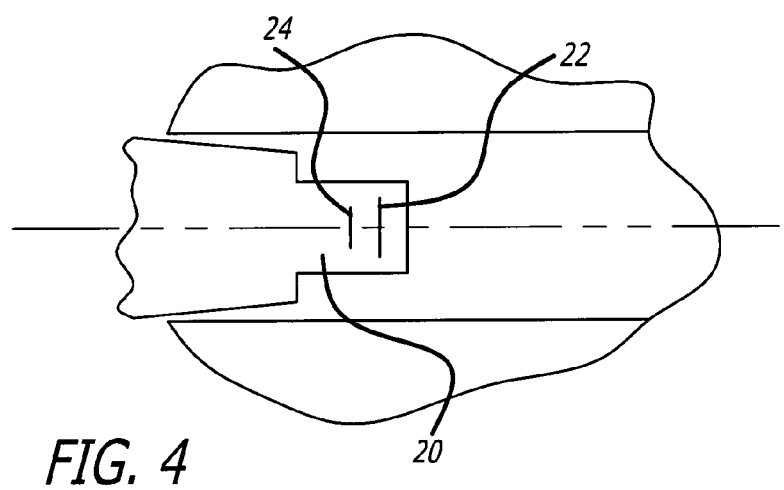
FIG. 4 is a top enlarged view of a head of the hard disk drive.

The disk drive 10 may include a plurality of heads 20 located adjacent to the disks 12. As shown in FIG. 4 the heads 20 may have separate write 22 and read elements 24. The write element 22 magnetizes the disk 12 to write data. The read element 24 senses the magnetic fields of the disks 12 to read data. By way of example, the read element 24 may be constructed from a magneto-resistive material that has a resistance which varies linearly with changes in magnetic flux.

Referring to FIG. 3, each head 20 may be gimbal mounted to a flexure arm 26 as part of a head gimbal assembly (HGA). The flexure arms 26 are attached to an actuator arm 28 that is pivotally mounted to the base plate 16 by a bearing assembly 30. A voice coil 32 is attached to the actuator arm 28. The voice coil 32 is coupled to a magnet assembly 34 to create a voice coil motor (VCM) 36. Providing a current to the voice coil 32 will create a torque that swings the actuator arm 28 and moves the heads 20 across the disks 12.

The hard disk drive 10 may include a printed circuit board assembly 38 that includes a plurality of integrated circuits 40 coupled to a printed circuit board 42. The printed circuit board 40 is coupled to the voice coil 32, heads 20 and spindle motor 14 by wires (not shown).

Figure 5:
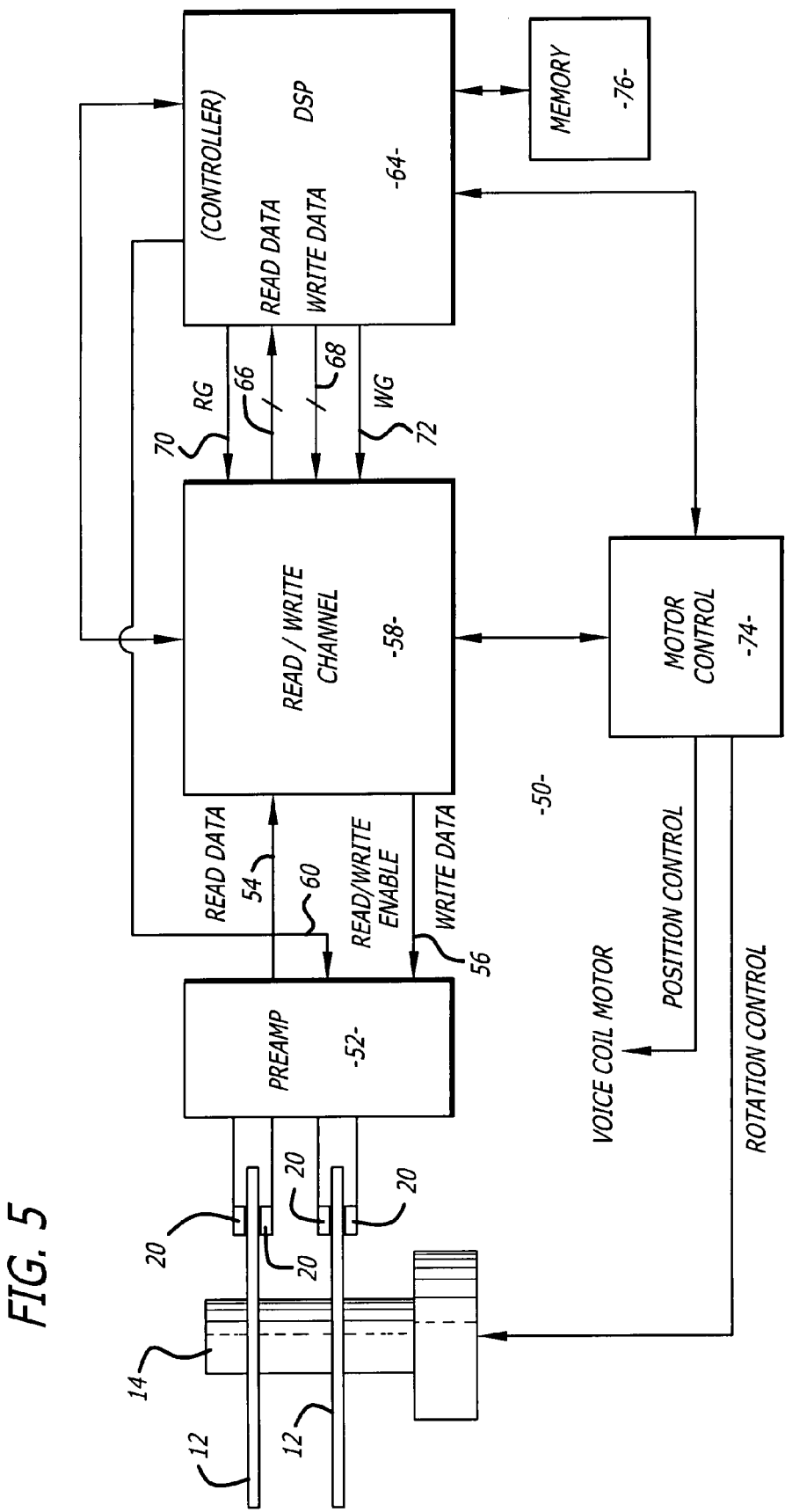
FIG. 5 is a schematic of an electrical circuit for the hard disk drive.

FIG. 5 shows an electrical circuit 50 for reading and writing data onto the disks 12. The circuit 50 may include a pre-amplifier circuit 52 that is coupled to the heads 20. The pre-amplifier circuit 52 has a read data channel 54 and a write data channel 56 that are connected to a read/write channel circuit 58. The pre-amplifier 52 also has a read/write enable gate 60 connected to a controller 64. Data can be written onto the disks 12, or read from the disks 12 by enabling the read/write enable gate 60.

The read/write channel circuit 58 is connected to the controller 64 through read and write channels 66 and 68, respectively, and read and write gates 70 and 72, respectively. The read gate 70 is enabled when data is to be read from the disks 12. The write gate 72 is to be enabled when writing data to the disks 12. The controller 64 may be a digital signal processor that operates in accordance with a software routine, including a routine(s) to write and read data from the disks 12. The read/write channel circuit 58 and controller 64 may also be connected to a motor control circuit 74 which controls the voice coil motor 36 and spindle motor 14 of the disk drive 10. The controller 64 may be connected to a non-volatile memory device 76. By way of example, the device 76 may be a read only memory ("ROM") that contains instructions that are read by the controller 64.

Figure 6:
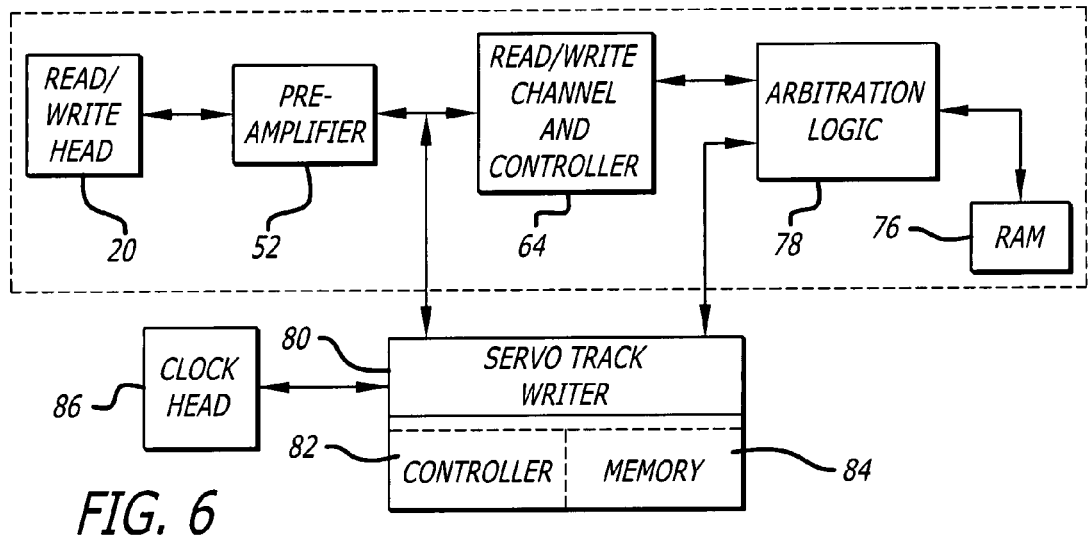
FIG. 6 is a schematic showing a servo writer connected to the hard disk drive.

During the manufacturing process of the disk drive 10 servo information must be written onto the disks 12. This is typically done with a servo track writer 80. FIG. 6 shows a servo track writer 80 connected to a hard disk drive 10. The servo track writer 80 may include a controller 82, memory 84 and other circuitry for writing servo information onto the disk(s) of the disk drive. The servo writer 80 may utilize the pre-amplifier, read/write channel, etc. of the disk drive to both write servo information, and to read servo information to position a head onto a track of the disk(s). The servo writer 80 also has a separate clock head 86 that can write and read a clock track of a disk. The head 86 and disk 12 may write and read signals with known perpendicular recording techniques.

Figure 1:
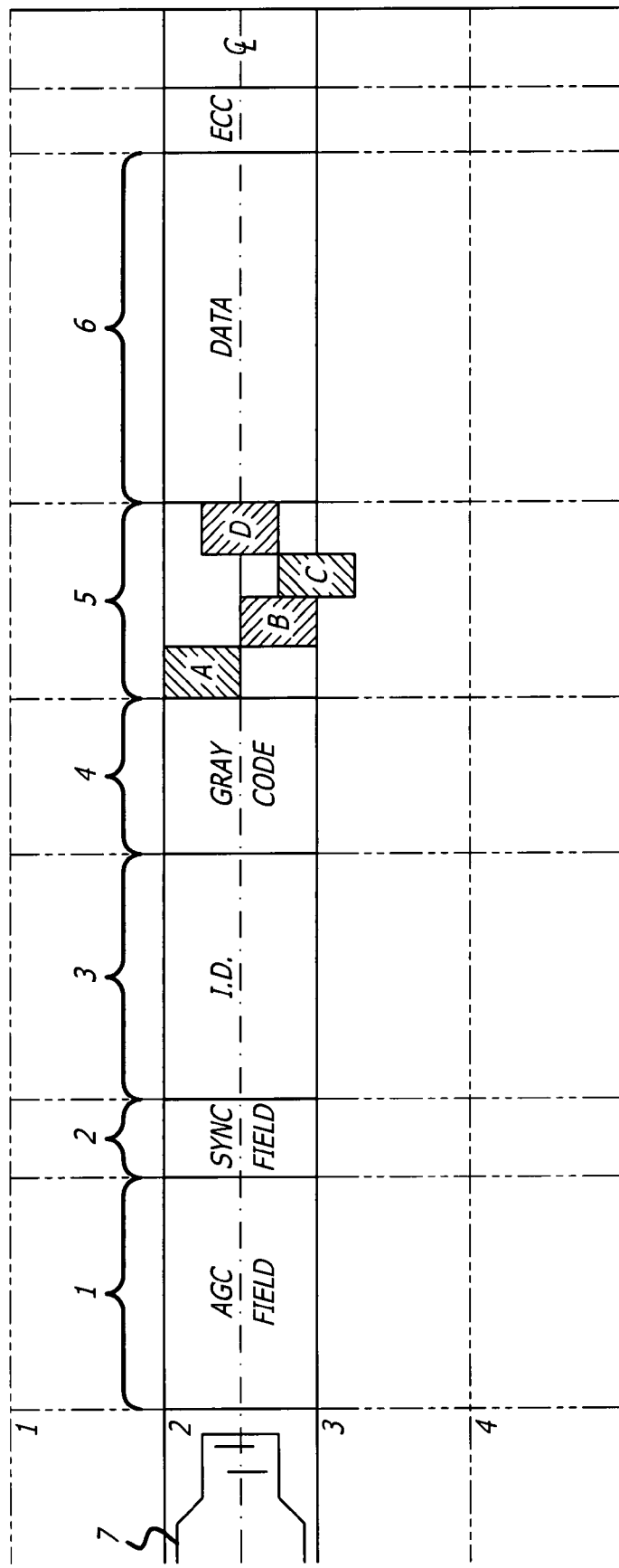
FIG. 1 is an illustration of a track of the prior art.
Figure 7:
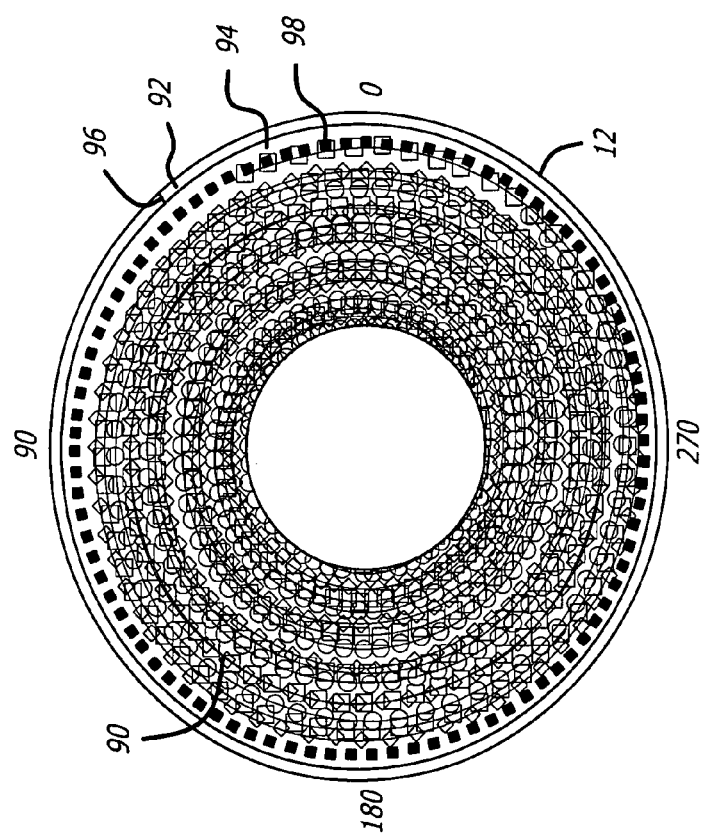
FIG. 7 is a disk with servo information written with a clock track and servo reference band.
Figure 2:
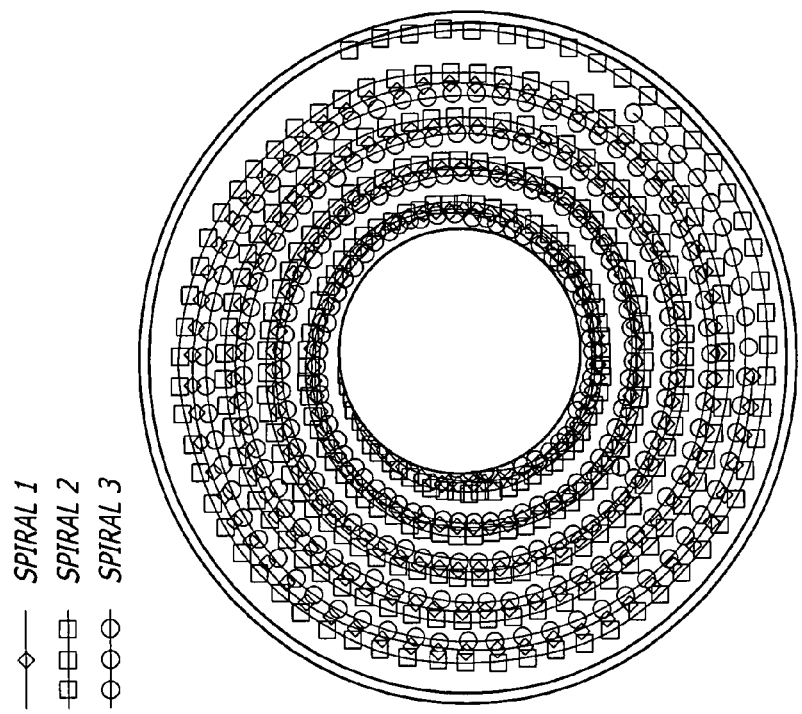
FIG. 2 is an illustration showing a plurality of spiral servo tracks written onto a disk in the prior art.

FIG. 7 shows a disk 12 with written spiral servo tracks 90. The disk 12 has an outer clock track 92 and a band of servo reference tracks 94. The clock track 92 contains a circumferential index 96. The reference tracks 94 include radial indices 98. The radial indices may be markers that indicate the first sector of a track.

FIG. 8 is a schematic of a circuit 100 that reads the clock track of the disk 12. The circuit 100 includes a differentiator circuit 102 that is connected to the clock head 86 by an input line 104. The clock head 86 reads the clock track of the disk 12. The clock track contains a clock signal that has a square waveform. The differentiator circuit 102 differentiates the clock signal. The differentiated clock signal is provided to a threshold comparator circuit (not shown) to detect missing or extra pulses in the signal.

The circuit 100 includes a clamping circuit 106. The clamping circuit 106 clamps the amplitude of the clock signal. By way of example, the clamping circuit 106 may be a Schottky diode. Clamping the clock signal minimizes ringing, undershoot and overshoot in the signal.

Figure 9:
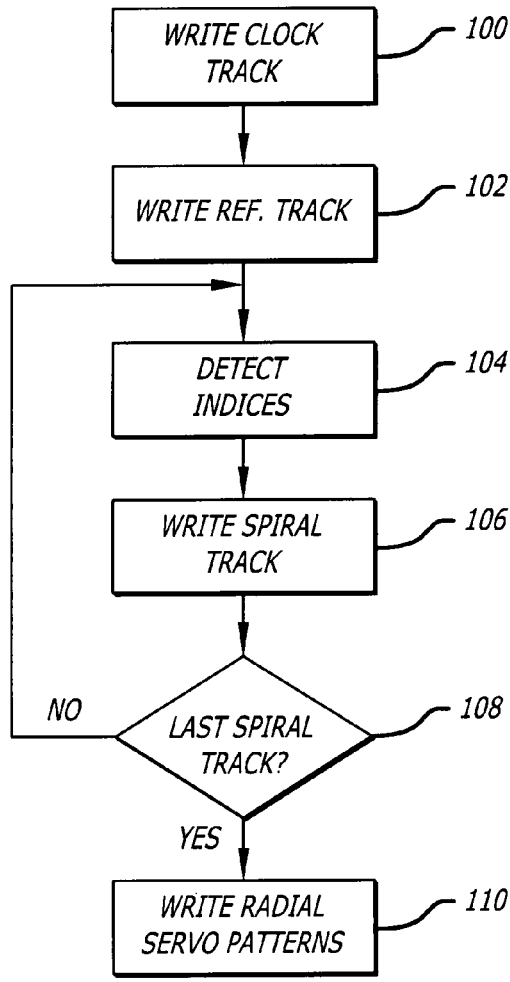
FIG. 9 is a flowchart describing a process to write a servo pattern onto a disk of the drive.

FIG. 9 is a flowchart describing the writing of reference information onto the disk(s) with the servo track writer. In block 100 a clock track is written onto an outer portion of the disk. The clock track may contain a sinusoidal signal. The circumferential index may be a portion of the sinusoidal signal that has a different frequency. The writing of the clock track can be performed by the servo writer controller through the clock head 86.

In block 102 a reference servo pattern is written at the reference radial position. To write the reference pattern, the head(s) of the drive is initially moved to a reference position. The reference position may be at the outer diameter, or the inner diameter, of the disk. The reference position may be established by the crash stop location of the drive. A plurality of servo patterns may be written to create a reference track. Additionally, several servo tracks may be written to create a band of reference servo tracks. The creation of the reference servo information can be caused by the controller of the servo track writer.

In block 104 the clock head reads the clock track and the head(s) of the disk drive are used to read the servo reference tracks to detect the circumferential index and the radial index, respectively. The controller of the servo track writer may utilize the servo capabilities of the disk drive to position the head(s). Upon detection of the indices the servo writer causes a spiral servo track to be written onto the disk(s) in block 106. The servo track writer controller then determines whether the last spiral servo track has been written in process block 108. If not, another spiral servo track is written onto the disk(s) after detection of the circumferential and radial indices. Using the indices insures that the spiral servo tracks have approximately the same start point. This improves the accuracy of the spiral tracks and the resultant radial servo tracks used by the drive. An increase in the accuracy of the servo information may lead to an increase in the density of the drive.

If the last spiral servo track has been written, then the servo writer writes radial servo tracks using the spiral servo track for positioning information in block 110. The radial servo tracks are used to position the heads during the normal operation of the drive.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A servo writer that writes servo information onto a disk of a hard disk drive that has a head, comprising:
   a clock head that reads a clock track of the disk;
   a differentiator circuit coupled to said clock head;
   a clamping circuit coupled to said clock head and said differentiator circuit; and,
   a controller coupled to said differentiator circuit, said controller writes a servo pattern onto the disk.

2. The servo writer of claim 1, wherein said clamping circuit is a Schottky diode.

3. The servo writer of claim 1, wherein said differentiator circuit differentiates perpendicularly recorded data on the disk.

4. The servo writer of claim 1, wherein said clamping circuit is in parallel with an input line between said clock head and said differentiator circuit.

5. A servo writer that writes servo information onto a disk of a hard disk drive that has a head, comprising:
- a clock head that reads a clock track of the disk and generates a clock signal;
- clamping means for clamping the clock signal;
- differentiator means for differentiating the clock signal; and,
- a controller coupled to said differentiator means, said controller writes a servo pattern onto the disk.

6. The servo writer of claim 1, wherein said clamping means includes a Schottky diode.

7. The servo writer of claim 1, wherein said differentiator means differentiates perpendicularly recorded data on the disk.

8. The servo writer of claim 1, wherein said clamping means is in parallel with an input line between said clock head and said differentiator means.

9. A circuit of a servo writer that writes servo information onto a disk of a hard disk drive that has a head, the servo writer including a clock head that reads a clock track of the disk, comprising:
- a differentiator circuit coupled to said clock head; and,
- a clamping circuit coupled to said clock head and said differentiator circuit.

10. The circuit of claim 9, wherein said clamping circuit is a Schottky diode.

11. The circuit of claim 9, wherein said differentiator circuit differentiates perpendicularly recorded data on the disk.

12. The circuit of claim 9, wherein said clamping circuit is in parallel with an input line between said clock head and said differentiator circuit.

13. A circuit of a servo writer that writes servo information onto a disk of a hard disk drive that has a head, the servo writer including a clock head that reads a clock track of the disk, comprising:
- clamping means for clamping the clock read back signal; and,
- differentiator means for differentiating the clock read back signal.

14. The circuit of claim 13, wherein said clamping means includes a Schottky diode.

15. The circuit of claim 13, wherein said differentiator means differentiates perpendicularly recorded data on the disk.

16. The circuit of claim 13, wherein said clamping means is in parallel with an input line between said clock head and said differentiator means.

17. A method for writing servo onto a disk of a hard disk drive, comprising:
- reading a clock signal from a clock track of the disk;
- clamping the clock signal;
- differentiating the clock signal;
- detecting a circumferential index from the clock signal; and,
- writing a spiral servo track onto the disk in response to the detection of the circumferential index.

18. The method of claim 17, wherein the clock signal is perpendicularly recorded.

19. The method of claim 17, wherein the clock signal is clamped with a Schottky diode.

20. The method of claim 17, wherein the clock signal is provided in parallel to a differentiator circuit through a clamping circuit and an input line.

\* \* \* \* \*